(No Model.) 3 Sheets—Sheet 1.
E. W. COLLINS.
CHECK ROW PLANTER.
No. 528,761. Patented Nov. 6, 1894.
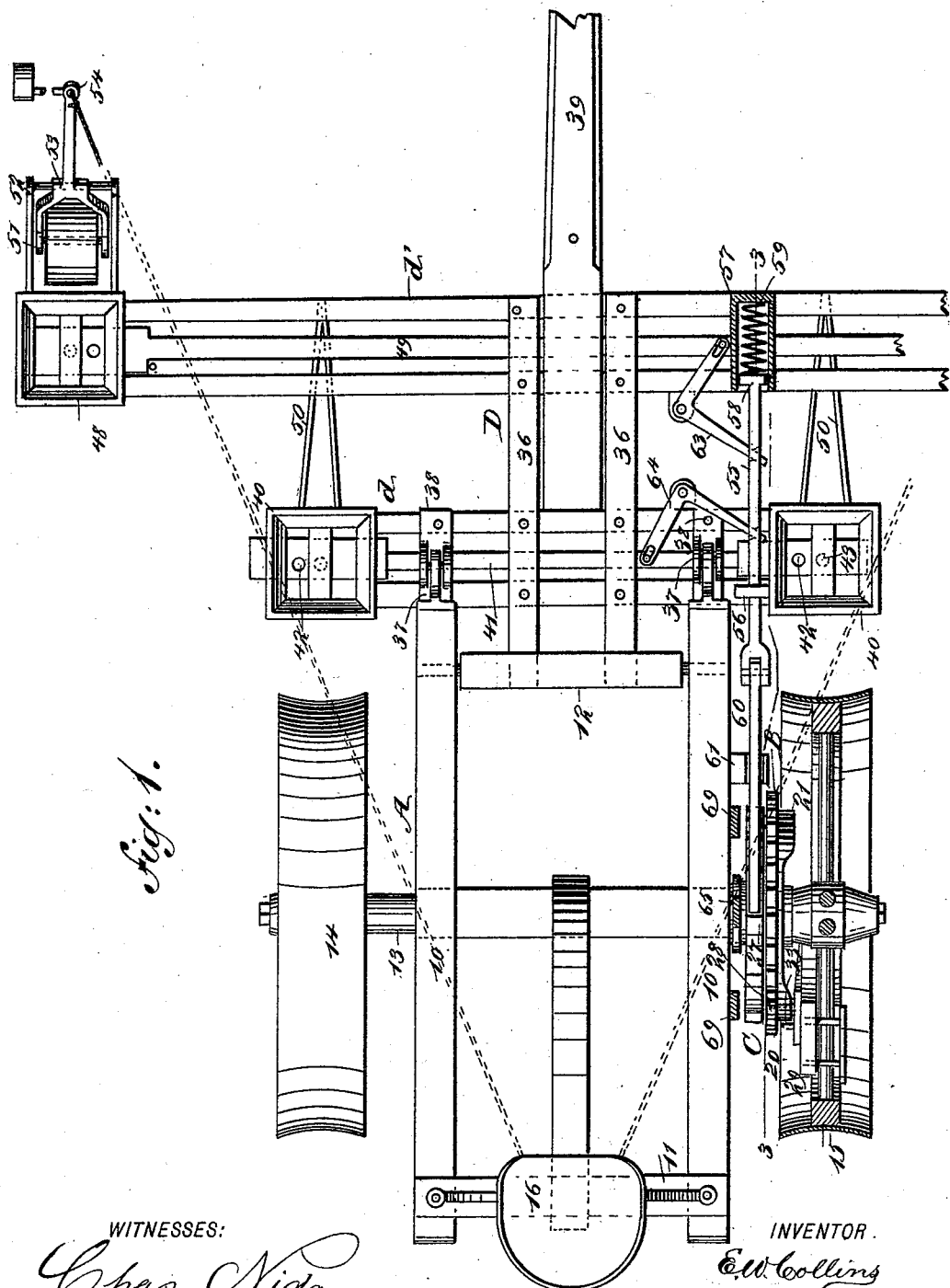
WITNESSES:
Chas. Nida.
C. Sedgwick
INVENTOR.
E. W. Collins
BY Munn & Co
ATTORNEYS.

(No Model.) 3 Sheets—Sheet 2.
E. W. COLLINS.
CHECK ROW PLANTER.
No. 528,761. Patented Nov. 6, 1894.
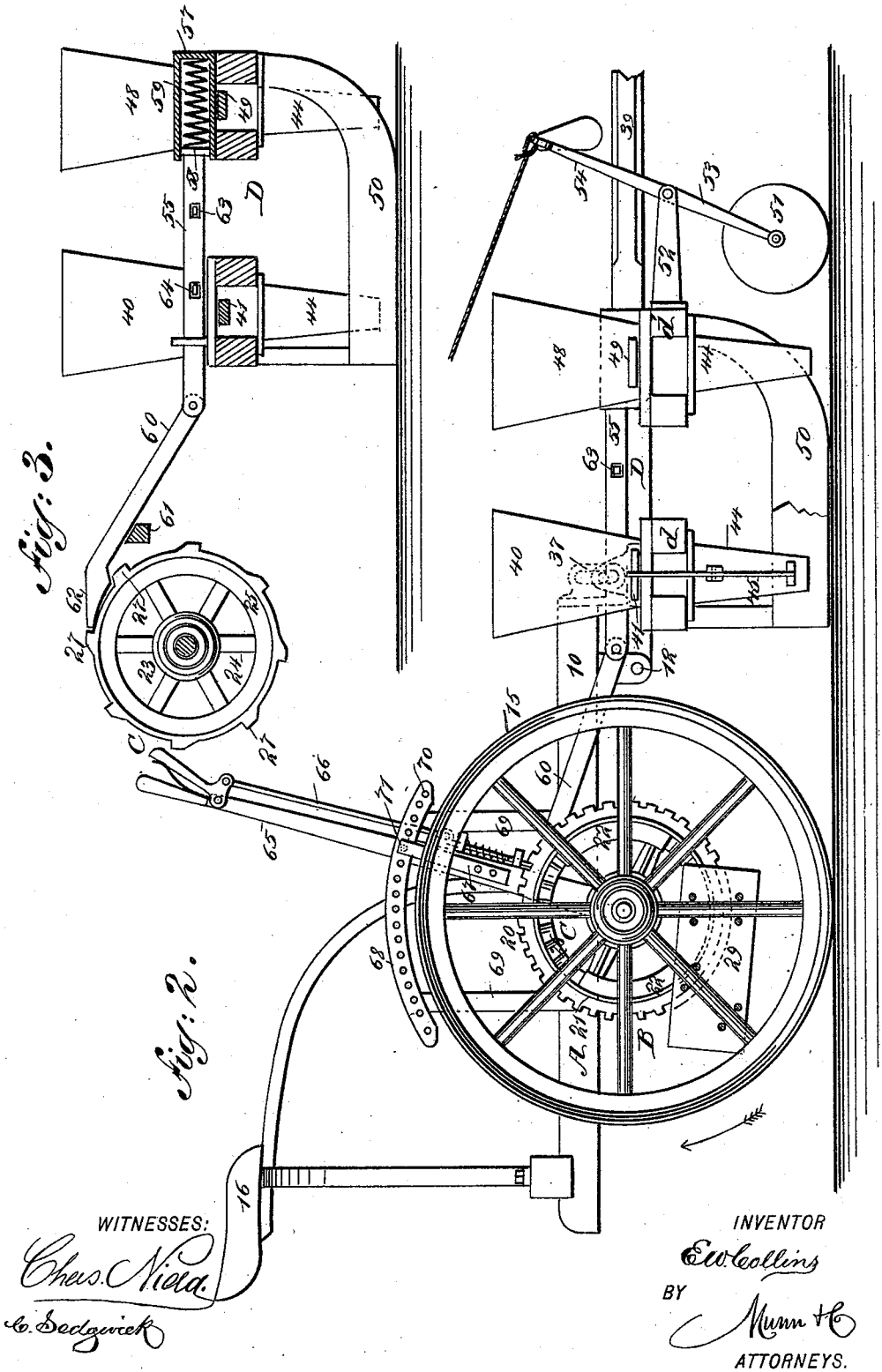
WITNESSES:
Chas. Nield
C. Sedgwick
INVENTOR
E. W. Collins
BY
Munn & Co.
ATTORNEYS.

(No Model.) 3 Sheets—Sheet 3.
E. W. COLLINS.
CHECK ROW PLANTER.
No. 528,761. Patented Nov. 6, 1894.
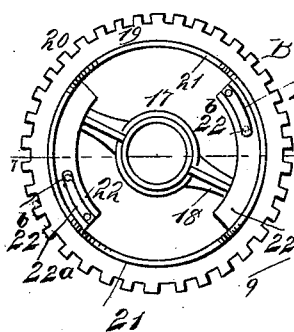
Fig: 6.
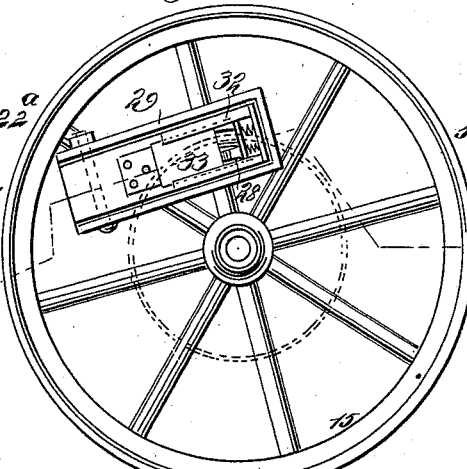
Fig: 8.
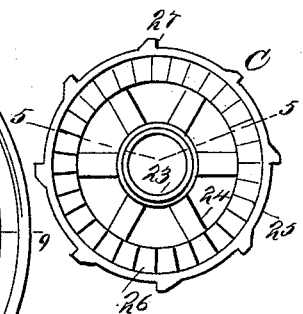
Fig: 4.
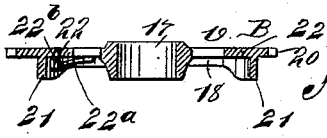
Fig: 7.
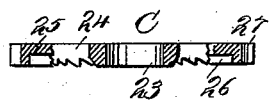
Fig: 5.
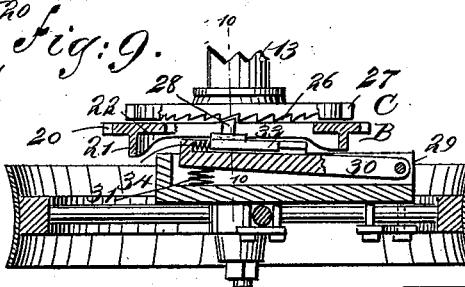
Fig: 9.
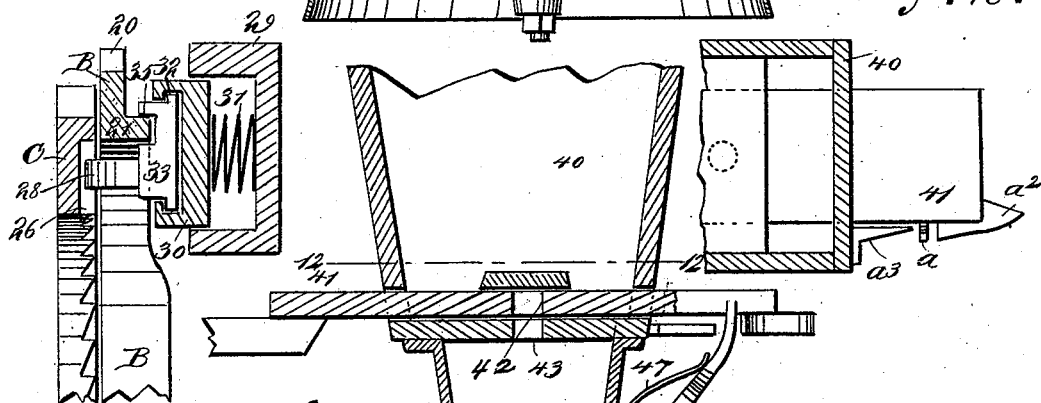
Fig: 10. Fig: 12.
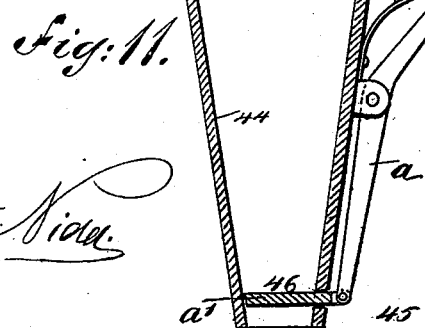
Fig: 11.
WITNESSES: Chas. Nider. C. Sedgwick.
INVENTOR E. W. Collins BY Munn & Co. ATTORNEYS.

UNITED STATES PATENT OFFICE.

EDWARD W. COLLINS, OF COALVILLE, IOWA.

CHECK-ROW PLANTER.

SPECIFICATION forming part of Letters Patent No. 528,761, dated November 6, 1894.

Application filed January 20, 1894. Serial No. 497,496. (No model.)

*To all whom it may concern:*

Be it known that I, EDWARD WILLIAM COLLINS, of Coalville, in the county of Webster and State of Iowa, have invented a new and Improved Check-Row Planter, of which the following is a full, clear, and exact description.

My invention relates to an improved check row planter, and it has for its object to construct a planter of that description in a simple, durable and economic manner, and to provide a means whereby a marking compound will be dropped upon the ground to check the rows, simultaneously with the dropping of the seed from the seed boxes.

A further object of the invention is to provide a means for smoothing or leveling the ground to receive the marking compound, and another feature of the invention is to provide a driving mechanism operated from one of the supporting wheels of the machine, which driving mechanism will have simultaneous and timed action upon the drop slides of both the marking and seed boxes.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is a side elevation thereof. Fig. 3 is a section taken practically on the line 3—3 of Fig. 1, illustrating the driving mechanism for the drop slides. Fig. 4 is an outer face view of the driving mechanism of the drop slides. Fig. 5 is a section through said gear mechanism taken practically on the line 5—5 of Fig. 4. Fig. 6 is an outer face view of the regulating gear of the driving gear of the drop slides. Fig. 7 is a section through the regulating gear taken practically on the line 7—7 of Fig. 6. Fig. 8 is an inner face view of the supporting wheel employed as a driver. Fig. 9 is a horizontal section taken practically on the line 9—9 of Fig. 8, said section being taken through the driving supporting wheel and likewise through the entire set of wheels or gears embodied in the driving mechanism for the drop slides. Fig. 10 is a section taken practically on the line 10—10 of Fig. 9. Fig. 11 is a vertical section through one of the boxes, the hopper connected with the box and the drop slide moving in the box, and illustrating also the application of a cut-off to the hopper, operated by the drop slide; and Fig. 12 is a horizontal section on the line 12—12 in Fig. 11.

In carrying out the invention the body frame A of the machine consists preferably of two side beams 10, connected by a rear beam 11 and forward beam 12, the said frame being mounted upon an axle 13, and upon said axle two supporting wheels 14 and 15, are loosely mounted, the tires of the wheels being exteriorly concaved. Upon the main frame A the driver's seat 16, is supported, and upon the axle adjacent to the right-hand supporting wheel 15 two gears B and C, are loosely mounted, the gear B, which is the outer gear, being adapted for regulating the stroke of the drop slides, while the inner gear C, is adapted as a driving gear for the said slides. The outer or regulating gear B, is shown in detail in Figs. 6 and 7, and the said gear consists of a hub 17, ordinarily connected by two opposing spokes 18 with a ring-like body 19, said body being provided with peripheral teeth 20, and upon its outer face, along its inner margin, with an annular cam rib 21, which rib stands at right angles to the outer face of the gear, as shown best in Fig. 7, and is cut away in such manner as to reduce it in width at diagonally opposite points. In fact, the rib is divided practically into four parts, two wide opposing portions of the same width, and two opposing narrow portions also of the same width, and where the portions connect the surfaces are more or less curved, as shown in Fig. 7. Opposite each wide section of the rib a flange or fender 22, is formed upon its under face, and the said flanges, as shown in Fig. 6, are made to terminate at the commencement of the narrower sections of the rib. A detent is located at opposite ends of the flanges 22 of the regulating gear, consisting of spring plates 22$^a$ secured at their outer ends to the flanges as shown in Figs. 6 and 7, their inner ends being free and provided with pins 22$^b$ located in suitable openings made in the flanges and normally held by the spring plates within said openings.

The driving gear C, is shown in detail in Figs. 4 and 5, and comprises a hub 23, spokes 24, and a ring-like body 25 connected with the hub by means of the spokes, said ring-like body being provided upon its outer face with a series of teeth 26, or cavities of any description; and the driving gear is further provided upon its peripheral surface with lugs 27, straight upon one face and inclined upon the other. Said lugs are ordinarily eight in number, and the distance between two lugs represents the distance that the driving gear is to be turned to impart a proper stroke to the drop slides of the machine. The driving gear is set in motion through the medium of a dog 28, said dog being carried by the right-hand supporting wheel 15, as shown in both Figs. 8 and 9. The manner of connecting the dog with the driving wheel is as follows: A shoe 29, is fulcrumed or otherwise secured to the spokes of the driving wheel 15, which shoe is practically rectangular in cross section, and is made to face the regulating gear B. At one end of the shoe a tongue 30, is pivoted, the pivot being located at one end of the tongue. The tongue is nearly the length of the shoe, and at the free end of the tongue a spring 31 is located at its back which likewise has bearing upon the shoe, as shown in Figs. 9 and 10. The spring normally forces the free end of the tongue in direction of the regulating gear B, and the tongue at its free end is provided with a slideway 32, extending a portion of its length, and in the said slide way the shank or body 33 of the dog 28 has longitudinal movement, the said shank or body of the dog being connected with the free end of the tongue through the medium of a spring 34. In this manner the dog and likewise the tongue may have movement to compensate for the jar of the machine while it is in operation.

The spring-pressed tongue 30, normally forces the dog inward in direction of the driving gear, and when the dog is not resting against the shields or fenders 22 on the regulating gear it will extend through that gear between the shields to an engagement with the teeth or cavities 26 in the outer face of the driving gear. Consequently, as the supporting wheel 15 is turned the dog will force the driving gear to turn also, revolving said wheel each time it engages with it, a distance corresponding to that between opposing lugs 27 on the said driving gear.

The cam rib 21 on the regulating gear is adapted as a guide for the dog 28, and to that end the shank or body 33 of the dog is provided with a recess 35, as shown in Fig. 10, which receives the cam rib, and the base wall of said recess is constantly in engagement with the outer face of the rib; and when the dog is carried over the wider sections of the rib, the dog will engage with the shield 22 adjacent to that section, and the dog will furthermore be withdrawn from engagement with the teeth or cavities in the driving gear, permitting that gear to remain silent or idle; but when the dog reaches the narrower sections of the cam rib, the dog, as heretofore stated, will be forced by its spring-pressed tongue, to a driving engagement with the driving gear C.

In addition to the main frame A heretofore described, the frame is provided with another frame D, which as is shown in Fig. 2, is lower than the main frame, although connected with it. The frame D, is adapted to carry the marking and seed boxes, and said frame consists primarily of two sets of parallel beams, designated respectively as $d$ and $d'$. Each set of beams extends transversely across the machine, and the inner or rear set $d$ is of less length than the outer set $d'$. The inner and outer sets of beams are connected by longitudinal beams 36, crossing the central portion of each set; and the box-carrying frame D, has a hinged connection with the body frame at the forward end of the latter, the connection being effected through the medium of hinges 37, as shown in Figs. 1 and 2, said hinges being attached to cross bars 38, secured each side of the center of the rear set of beams $d$. The pole 39 is attached to the central portion of both sets of beams $d$ and $d'$.

The seed boxes 40, are located one at each end of the inner set of beams $d$, and one drop slide 41, having longitudinal sliding movement upon the rear set of beams $d$, controls each seed box 40, the ends of the slide contained within the boxes being each provided with an opening 42, as shown in Fig. 11; and when an opening 42 in a drop slide is filled with seed the amount of seed held in the opening represents the amount to be planted in a hill; and when the drop slide is manipulated to bring its opening 42 in registry with openings 43 produced in the bottom of each seed box, the seed will escape from the boxes through the latter openings 43. The openings 42 in the seed drop slide are so arranged that both of them will receive and discharge at the same time. Each seed box is provided with a hopper 44, secured upon its under face, into which the seed from the discharge openings 43 drops. The seed to be planted is held in the hopper 44 through the medium of a valve 45, which valve, as shown in Fig. 11, comprises a stem $a$, fulcrumed at or near its center upon the exterior of the hopper, and a body $a'$ at the lower end of the stem, the said body of the valve being adapted to enter the lower portion of the hopper through an opening 46, made therein, as likewise shown in Fig. 11 and completely close the lower portion of the hopper; but the valve is held normally in a closed position through the medium of a spring 47, secured to one side of the hopper and bearing against the stem of the valve. The upper end of the valve stem is carried up sufficiently high to be acted upon by the outer end of the drop slide 41 when said slide is upon its return stroke.

It is only upon the rearward stroke of the drop slide that the seed and plaster are checked into the hoppers, and the valves in the hoppers are intended to open at this time and discharge the seed or plaster previously delivered into the hoppers. Thus the valves are opened only momentarily to discharge, and close before the seed or plaster being delivered into the hoppers reaches the bottom.

The tripping of the valve is effected in the following manner: A lug $a^2$ is located upon one side of the drop slide, which lug is in the nature of a catch, and is intended to pass the valve stem $a$ upon its outward stroke and get a position behind the stem. When the drop slide is carried backward, the end of the valve stem is drawn inward and the valve is opened, and is kept open until the stem $a$ is forced from the lug $a^2$ by engagement with an inclined surface $a^3$ located upon the side of the box 40. Thus a snap motion is imparted to the valve stem at each backward movement of the drop slide.

The boxes 48, adapted to receive and carry the marking compound, which, for example, may be pulverized chalk, are located at the extremities of the forward set of beams $d'$ of the box-carrying frame, and the marking boxes are provided with valved hoppers similar to those described in connection with the seed boxes, and the marking boxes are operated through the medium of a single drop slide 49, in like manner as has been heretofore described in connection with the seed boxes. The seed boxes are provided with the usual runners 50, which may also be used in connection with the marking boxes if in practice it is found desirable.

In order that the ground shall be rendered smooth where the marking compound is to be dropped, a roller 51 is located in advance of each marking box, as shown in Fig. 1, and the said rollers are so connected with the frame of the machine that one or both of them may be elevated from the ground when occasion may demand. The rollers may be elevated in the following manner: The arm 54 upon which a roller is mounted, is made to extend outward some distance and is weighted in a manner to overbalance the roller, and a cord is connected with the weighted end of the arm and carried to the driver's seat and there secured. By releasing the strain on the cord the weight on the arm will act to elevate the roller. The rollers serve as guides for the driver, as they always point over the track of the roller mark made on the previous trip. Usually when one roller is acting upon the ground the other roller is removed from engagement with the ground. One means of locating the rollers is shown in the drawings, which consists in projecting from the forward set of beams $d'$ in front of the marking boxes, arms 52, in which the supports 53 of the rollers are pivoted, the supports being provided with arms 54, projected upward therefrom, so that by attaching cords to the arms and leading them to the driver's seat one or both rollers may be raised from the ground.

Both drop slides are operated at the same time, and therefore the contents of all of the boxes carried by the machine will be simultaneously discharged. This is effected through the medium of a plunger 55, which is held to slide in suitable guides 56 upon the inner set of beams $d$, of the advance or box-carrying frame D; and the plunger is located adjacent to the right-hand seed box, while the forward end of the plunger enters a cylinder 57, or other form of box, closed with the exception of at one end; and at that end a head 58, formed upon the plunger, enters the box or cylinder and bears against a spring 59, located in the latter, as shown in both Figs. 1 and 3. The rear end of the plunger is pivotally connected with the forward end of a driving rod or bar 60, which rod or bar is inclined upward, and is made to slide upon an inclined support 61, attached to the right-hand side of the main frame of the machine. The driving rod or bar may be made to terminate at its upper or rear end in a shoe 62, which shoe when used is adapted to enter the space between any two of the lugs 27 on the driving gear C, but the shoe may be omitted if desired.

Motion is communicated to the drop slides from the plunger by angle or bell crank levers 63 and 64, the lever 63 being fulcrumed upon the advanced or forward set of beams $d'$ of the box-carrying frame; and one end of the lever is operated upon by the plunger while the opposite end is connected with the drop slide 49. The lever 64 is fulcrumed upon the inner set of beams $d$. It is likewise operated upon by the plunger 55, and is connected with the drop slide 41.

In the operation of the machine, as it is drawn forward, when the dog 28 of the driving mechanism of the machine engages with the teeth of the driving gear C, it revolves said gear, as heretofore stated, and the shoe 62 of the driving rod or bar being in engagement with the lugs of the driving gear as shown in Fig. 3, as the gear is forwardly revolved the driving rod is pushed forward, carrying the plunger 55 in the same direction and compressing the spring 59 in the cylinder 57. As the shoe reaches the inclined support 61 of the driving rod or bar, it is thrown out of engagement with the driving gear, and at the same time the dog 28 will be carried out of engagement with the gear, as it will have reached the wider portion of its guide cam 21, and the spring 59, will thereupon expand, assuming its normal position, and in so doing the spring will force the plunger and driving bar back to their normal position, the latter in engagement with the driving gear; and as the plunger is forced rearward the drop slides are operated. Upon the backward movement of each drop slide, the hoppers will be momentarily opened to permit the seed or marking material previously placed in the hoppers to discharge, and the valves will close the hoppers again before the seed from the boxes can fall through the hoppers. Simultaneously with the dog 28 passing out of driving connection with the driving gear C, said dog will compress the spring plate 22ᵃ of one of the detents upon the regulating gear B, and cause the pin 22ᵇ of that plate to enter one of the cavities 26 in the driving gear and stop the revolution of the latter. As soon as the dog passes the detent, the detent springs back from engagement with the driving gear, that it may be again driven when engaged by the dog.

In order that the driving gear may be temporarily shifted to drop sooner or later than it would under ordinary circumstances, a shifting lever 65, is employed, and the said shifting lever is preferably loosely mounted upon the axle near the driving gear C, the said lever being provided with a thumb latch 66, adapted for engagement with the peripheral teeth 20 on the regulating gear B. The lever is provided with a spring-pressed tongue 67 near its lower end, and the tongue is adapted to travel upon one side of the rack 68, while the opposing face of the lever travels upon the opposite face of the said rack, as shown in Fig. 2, the rack being supported from the main frame of the machine by suitable standards 69; and the rack is ordinarily provided with a series of apertures 70, adapted to receive a pin 71, shown in dotted lines in Fig. 2, and carried by the body of the lever 65, whereby the lever is held in any position in which it may be placed. It is evident that by shifting the lever 65 forward or rearward, the boxes may be made to discharge wherever it is desired, and that afterward they will discharge at the regular or predetermined intervals.

In addition to the hinged connection 37 between the main frame A and the box-carrying frame D, the longitudinal beams 36 of the latter frame are connected with the cross bar 12 of the main frame A, and the said cross bar 12 is pivoted in suitable bearings in the main frame, so that by the application of any desired form of lifting apparatus to the box-carrying frame, that frame may be lifted so as to clear the ground any desired distance.

The marking or plaster boxes may be set on the same drop slides as the seed boxes, and one-half a row in advance, if desired. By this arrangement, the drop slides can continue through the seed and plaster boxes on the same line.

Having thus described my invention, I claim as new and desire to secure by Letters Patent—

1. In a check row planter, the combination with seed boxes, of boxes adapted to carry a marking material, a spring controlled plunger connected by angle levers with the drop slide of both boxes for simultaneously operating the same, and a driving mechanism connected with one of the wheels of the machine and with the said plunger, substantially as described.

2. In a check row planter, the combination with seed boxes and the drop slide therefor, of boxes adapted to contain a marking material, a drop slide operating in the marking boxes, angle levers fulcrumed upon the frame of the machine and connected with the drop slide of both sets of boxes, a spring controlled plunger connected with both of said angle levers for operating the same, a driving rod or bar connected with said plunger and mechanism connected with one of the wheels of the machine for operating said driving rod, substantially as shown and described.

3. In a check row planter, the combination, with a set of seed boxes, a set of boxes adapted to contain a marking material, and the drop slides of both sets of boxes, of a spring controlled plunger, angle levers fulcrumed upon fixed supports and connected with the plunger and with the drop slides of the boxes, a spring-controlled dog adapted to be carried by one of the supporting wheels of the machine, a driving gear loosely mounted upon the axle of the machine, provided with peripheral lugs and side projections for engagement with the dog, a driving bar connected with the plunger and operated upon by the lugs of the driving gear, and a guide for the dog, the said guide having an undulating surface, whereby the dog is carried into engagement with the offset on the driving gear and out of engagement therewith, as and for the purpose set forth.

4. In a check row planter, the combination, with boxes, drop slides connected therewith, a spring-controlled plunger, and levers connecting the plunger with the drop slides, of a spring-controlled dog adapted for attachment to one of the supporting wheels of the machine, a regulating wheel adapted to be loosely mounted upon the axle of the machine and provided with openings in its side face, extending through the same, an annular cam flange facing the dog, a guide connection between the dog and the cam, and fenders located at the wider portions of the cam, a driving gear adapted to be loosely mounted upon the axle and having lugs upon its periphery and projections upon one side face, the projections being adapted for engagement with the dog, and a driving rod or bar engaged by the peripheral lugs of the driving gear and pivotally connected with the said plunger, substantially as and for the purpose specified.

5. In a check row planter, the combination, with boxes, their drop slides and spring-controlled plunger, and levers connecting the plunger with the drop slides, of an axle, supporting wheels located upon the axle, a spring controlled dog carried by one of the supporting wheels, a regulating wheel loosely mounted upon the axle and provided with peripheral teeth, and an annular cam rib facing the dog, the wheel having openings below the narrower portion of the cam for the passage of the dog, a guide connection between the dog and the cam, a driving wheel also loosely mounted upon the axle, having peripheral lugs and side teeth, the teeth being in engagement with the dog, a shifting lever adapted for engagement with the peripheral teeth of the regulating wheel, and a driving rod or bar pivotally connected with the plunger and operated by the projections on the driving wheel, substantially as shown and described.

6. In a check row planter, the combination with seed boxes, of boxes adapted to carry a marking material, discharge hoppers secured upon the under face of the said seed and marking boxes and provided with valves, each of said valves comprising a stem fulcrumed upon the exterior of the hopper and a body at the lower end of the stem and adapted to enter the lower portion of the hopper through a side opening made therein and close the lower portion of the said hopper the said valve being held normally in a closed position by a spring bearing against the stem of the valve drop slides for the said seed and marking boxes, the outer ends of said drop slides being adapted to engage with the upper ends of the stems of the hopper valves and operate the same, means for disengaging said valve stems from said drop slides and a driving mechanism for simultaneously operating the said drop slides, substantially as set forth.

7. In a check row planter, the combination with the frame of the machine of the seed boxes and boxes adapted to contain a marking material, a driving mechanism for operating the drop slides of both sets of boxes, a roller located in advance of each marking box for smoothing the ground to receive the marking compound, the support for each of said rollers being pivoted to the frame of the machine and provided with upwardly extending weighted arms, and means connected with the arms for raising and lowering the said rollers, substantially as shown and described.

8. In a check row planter, the combination with seed boxes and boxes adapted to carry a marking material, of mechanism for simultaneously operating the drop slides of both boxes, a driving gear mounted loosely on the axle of the machine and connected with the said mechanism, a dog carried by one of the supporting wheels of the machine and engaging with said driving gear, for part of its movement to drive the same and means controlled by said dog, for engaging said driving gear to stop the revolution of the same when said dog becomes disengaged therefrom, substantially as shown and described.

EDWARD W. COLLINS.

Witnesses:
   JOHN SMITH,
   WILLIAM PACKETT.